(12) United States Patent
Gardner

(10) Patent No.: US 8,266,843 B2
(45) Date of Patent: Sep. 18, 2012

(54) SLIDE-OUT ROOM ACTUATOR

(75) Inventor: Stewart E. Gardner, Bristol, IN (US)

(73) Assignee: R-N-R International, Inc., Bristol, IN (US)

( * ) Notice: Subject to any disclaimer, the term of this patent is extended or adjusted under 35 U.S.C. 154(b) by 234 days.

(21) Appl. No.: 12/655,456

(22) Filed: Dec. 30, 2009

(65) Prior Publication Data

US 2011/0156430 A1 Jun. 30, 2011

(51) Int. Cl.
*E04B 1/346* (2006.01)
(52) U.S. Cl. ............ 52/67; 296/175; 296/26.13
(58) Field of Classification Search .......... 52/64, 67, 52/79.5, 79.1; 296/175, 165, 171, 176, 172, 296/22.09, 26.13
See application file for complete search history.

(56) References Cited

U.S. PATENT DOCUMENTS

| | | | |
|---|---|---|---|
| 5,634,683 A * | 6/1997 | Young | 296/165 |
| 7,607,365 B1 * | 10/2009 | Courser | 74/89.11 |
| 2002/0023393 A1 * | 2/2002 | McManus | 52/67 |
| 2005/0179278 A1 * | 8/2005 | Yoder | 296/26.13 |
| 2011/0266830 A1 * | 11/2011 | Schwindaman et al. | 296/171 |

* cited by examiner

*Primary Examiner* — Jessica Laux
(74) *Attorney, Agent, or Firm* — R. Tracy Crump

(57) ABSTRACT

The actuator uses reinforced polyurethane timing belts as a flexible rack member mounted to the slide-out room and a pinion assembly mounted at the top and bottom of the slide-out opening of the main compartment. A pair of timing belts are mounted at the corners of the slide-out room top and floor, each running longitudinally to the direction of the slide-out movement. Each pinion block includes a pinion and two idle rollers. The timing belts pass through the drive block being trained around the pinion between two idle rollers in a serpentine fashion. A reversible electric motor, which is operatively connected to all four pinion blocks, simultaneously turns the pinions to propel the timing belts through the pinion blocks thereby extending and retracting the slide-out room through the slide-out opening.

2 Claims, 8 Drawing Sheets

SLIDE-OUT ROOM ACTUATOR

This invention relates to slide-out room applications and specifically the mechanisms for moving a slide-out room between its extended and retracted position relative to the main compartment structure.

BACKGROUND AND SUMMARY OF THE INVENTION

Slide-out rooms extend and retract from the main body of recreational vehicles (RVs) and other types of manufactured housing to provide additional living space. While a popular and convenient feature, the mechanisms used to move the slide-out room between its extended and retracted positions have heretofore suffered from a variety of operational and manufacturing problems. An array of hydraulic, pneumatic and electro-mechanical actuation devices ("actuators") have been employed with varying degrees of success, including screw drives, chains, rack and pinions, telescoping rams, as well as various linkage arrangements. Typically, these actuation mechanisms have been disposed under the slide-out room floor or within the slide-out room sidewalls. Conventional actuation mechanisms often needed support arms and other linkage members to support and guide the slide-out room as it moves between the extended and retracted positions. As such, the actuation mechanisms and support members occupy space within the slide-out room and main compartment which is lost as living space. In addition, the installation of these actuation mechanism in the manufacture of slide-out room structures is often difficult. Because the slide-out rooms and compartment openings are seldom perfectly square, the installation and alignment of the actuation mechanism often requires extensive adjustments and reworks. Misalignment of the actuation mechanisms can cause the mechanical components to wear and their operation to fail over time. Servicing and repairing the actuation mechanisms is also complicated by the lack of access to the mechanisms, which are embedded within the floor and walls of the slide-out room and compartment. Consequently, it is always desirable to minimize the size, weight and cost of the actuation mechanism, as well as to improve the ease of its manufacture and service.

The present invention provides an improved actuation mechanism ("actuator") for slide-out room applications. The actuator uses timing belts as flexible rack members in a rack and pinion type drive mechanism. Timing belts have been used in a variety of other applications, but heretofore not as part of a rack and pinion drive mechanism. The timing belts are mounted to the slide-out room and drive blocks are mounted at the top and bottom of the slide-out opening of the main compartment. A pair of timing belts are mounted at the corners of the slide-out room top and floor, each running longitudinally to the direction of the slide-out movement. Each drive block includes a pinion and two idle rollers. Each timing belt passes through a drive block being trained around the pinion between two idle rollers in a serpentine fashion. A reversible electric motor, which is operatively connected to all four pinion blocks, simultaneously turns the pinions to propel the timing belts through the pinion blocks thereby extending and retracting the slide-out room through the slide-out opening. The ends of the timing belts are secured to the slide-out room using U-shaped channel and clamping plates, which allow for longitudinal adjustment of the belt position.

The actuation mechanism embodying the present invention provides several significant benefits over conventional slide-out actuating mechanisms. The use of flexible timing belts greatly reduces the height and profile of the actuation mechanism thereby increasing the useful living space of the slide-out room, as well as reducing the weight of the mechanism itself. Using four timing belts eliminates the need for additional support members, which also helps maximize living space. The polyurethane timing belts are light weight, durable and generally maintenance free. The reduced weight of the timing belts over traditional rigid metal racks means smaller and less costly drive motors and components can be used.

The use of timing belts in the actuator of this invention also provides manufacturing and maintenance advantages in slide-out room applications. Because timing belts are durable, resist stretch and require little lubrication, the actuator of this invention requires little care or maintenance once installed. In the rare case that adjustment or replacements are needed, the majority of the actuator's components are readily accessible. The timing belts are easily mounted to the slide-out floor and top, which means improved manufacturing ease. The mounting channels and clamping plates allow the slack timing belts to be quickly and readily tightened once operatively mated through the drive block. More importantly, the mounting channels and clamping plates allow for the adjustment of the timing belts relative to the slide-out room so that the slide-out room can be retracted and extended squarely from the main compartment.

These and other advantages of the present invention will become apparent from the following description of an embodiment of the invention with reference to the accompanying drawings.

BRIEF DESCRIPTION OF THE DRAWINGS

The drawings illustrate an embodiment of the present invention, in which.

DESCRIPTION OF THE PREFERRED EMBODIMENT

Figure 1:
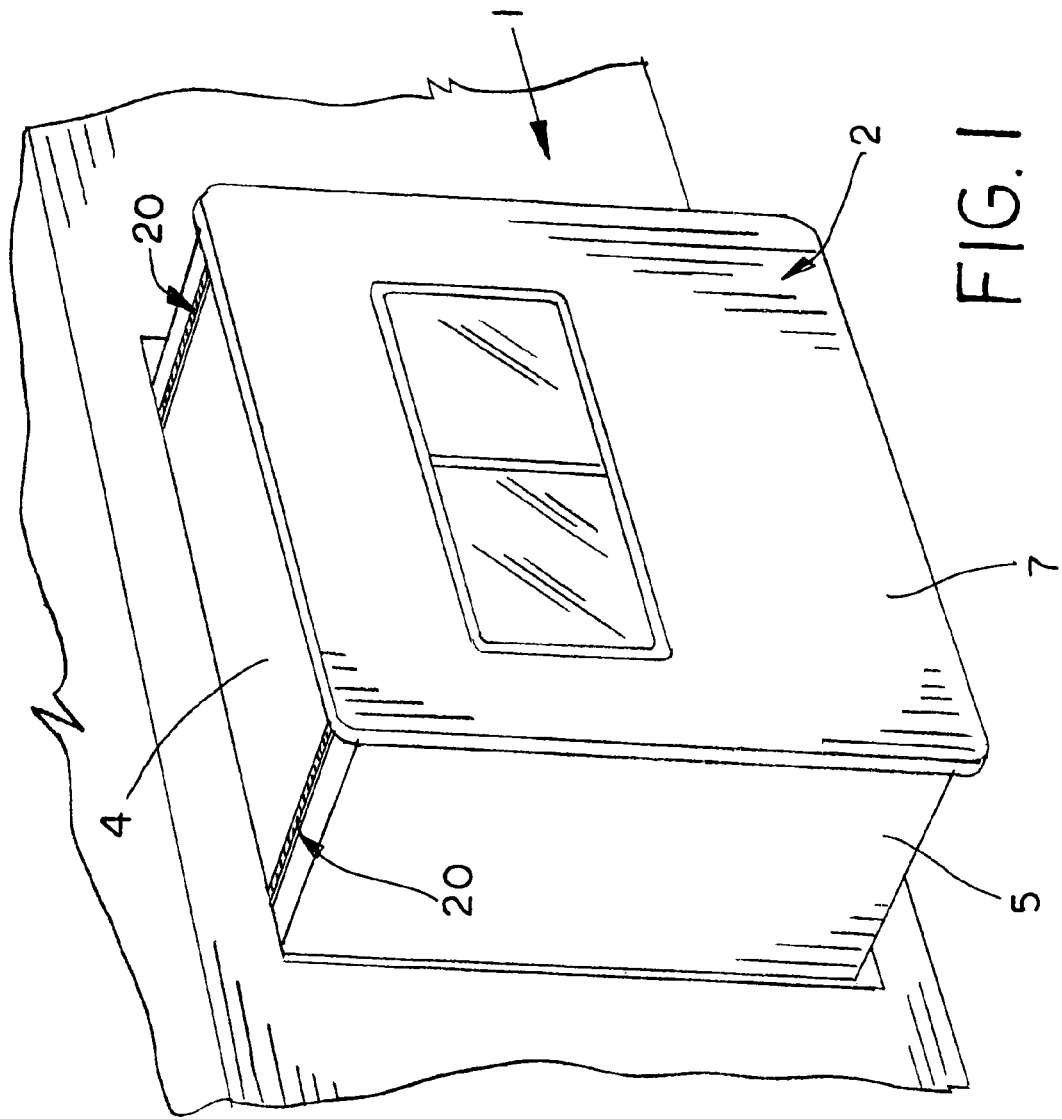
FIG. 1 is a partial perspective view of a slide-out room application using the actuation mechanism embodying the present invention showing the slide-out room in its extended position.
Figure 2:
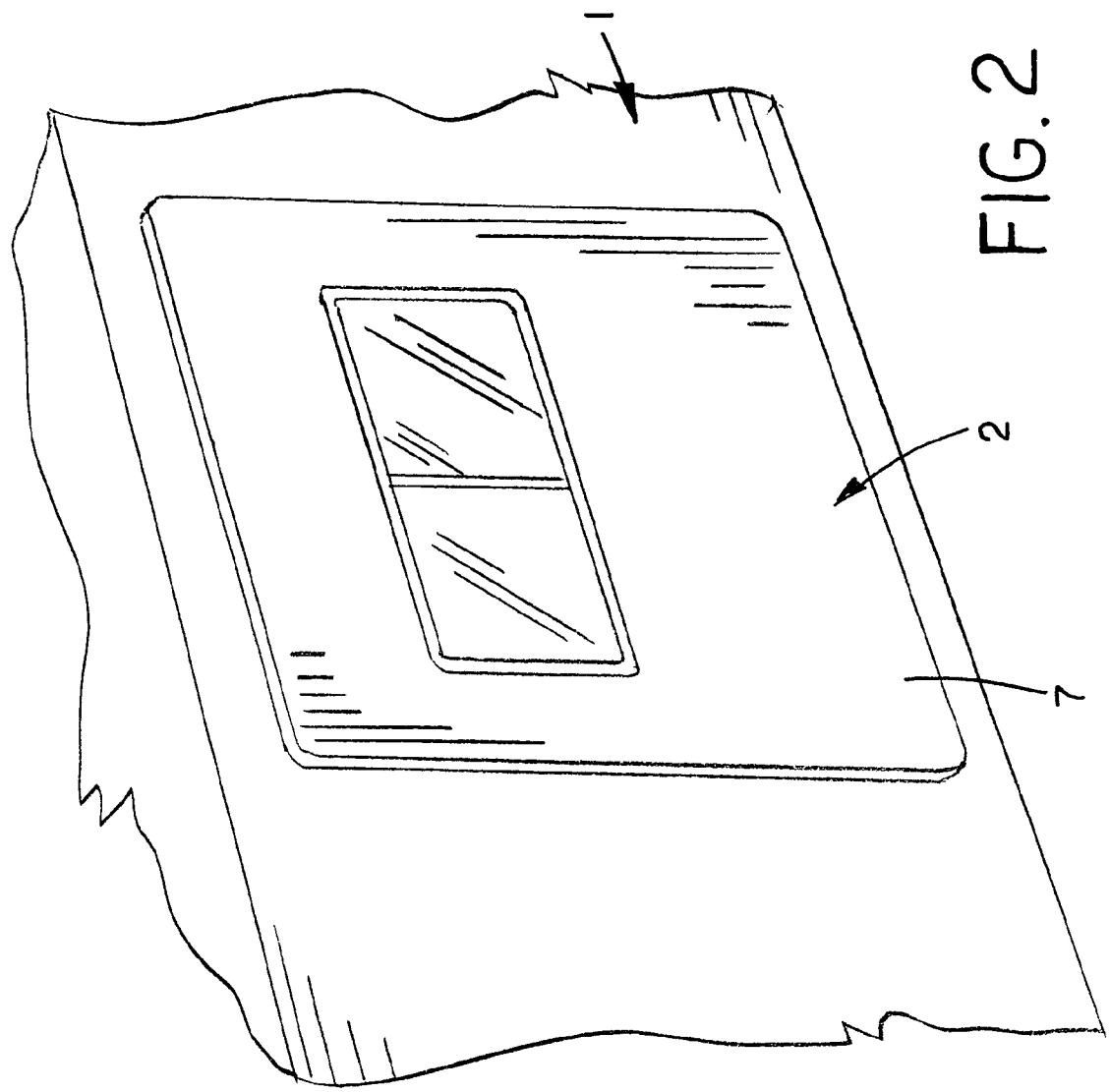
FIG. 2 is a partial perspective view of the slide-out room application of FIG. 1 showing the slide-out room in its extended position.
Figure 7:
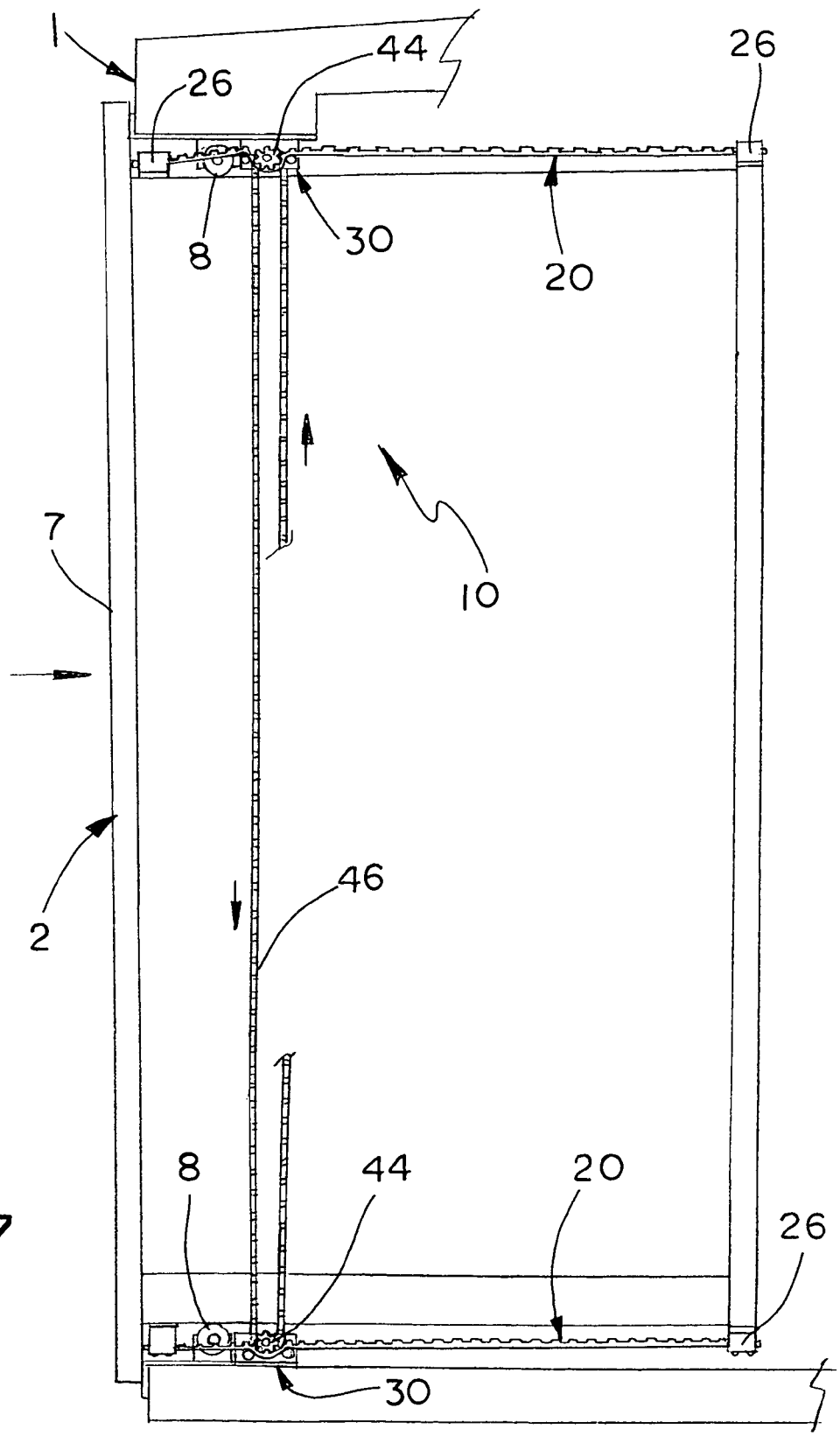
FIG. 7 is a partial side sectional view of the slide-out room application of FIG. 1 with the slide-out room in the retracted position showing the actuation mechanism of FIG. 3.

FIGS. 1-8 illustrate an embodiment of the actuator apparatus (actuator) of this invention, which designated generally as reference numeral 10 is used in a typical slide-out room application. As shown, slide-out room 2 extends and retracts from an opening 3 in an exterior sidewall of a main compartment 1. Slide-out room 2 includes, a top 4 and floor 6 and two side walls 5, as well as an exterior wall 7. Slide-out room 2 rides on a pair of top and bottom support rollers 8, which are mounted at the mouth of the slide-out opening. Actuator 10 moves slide-out room 2 between its extended position (FIGS. 1 and 8) and retracted positions (FIGS. 2 and 7).

Figure 3:
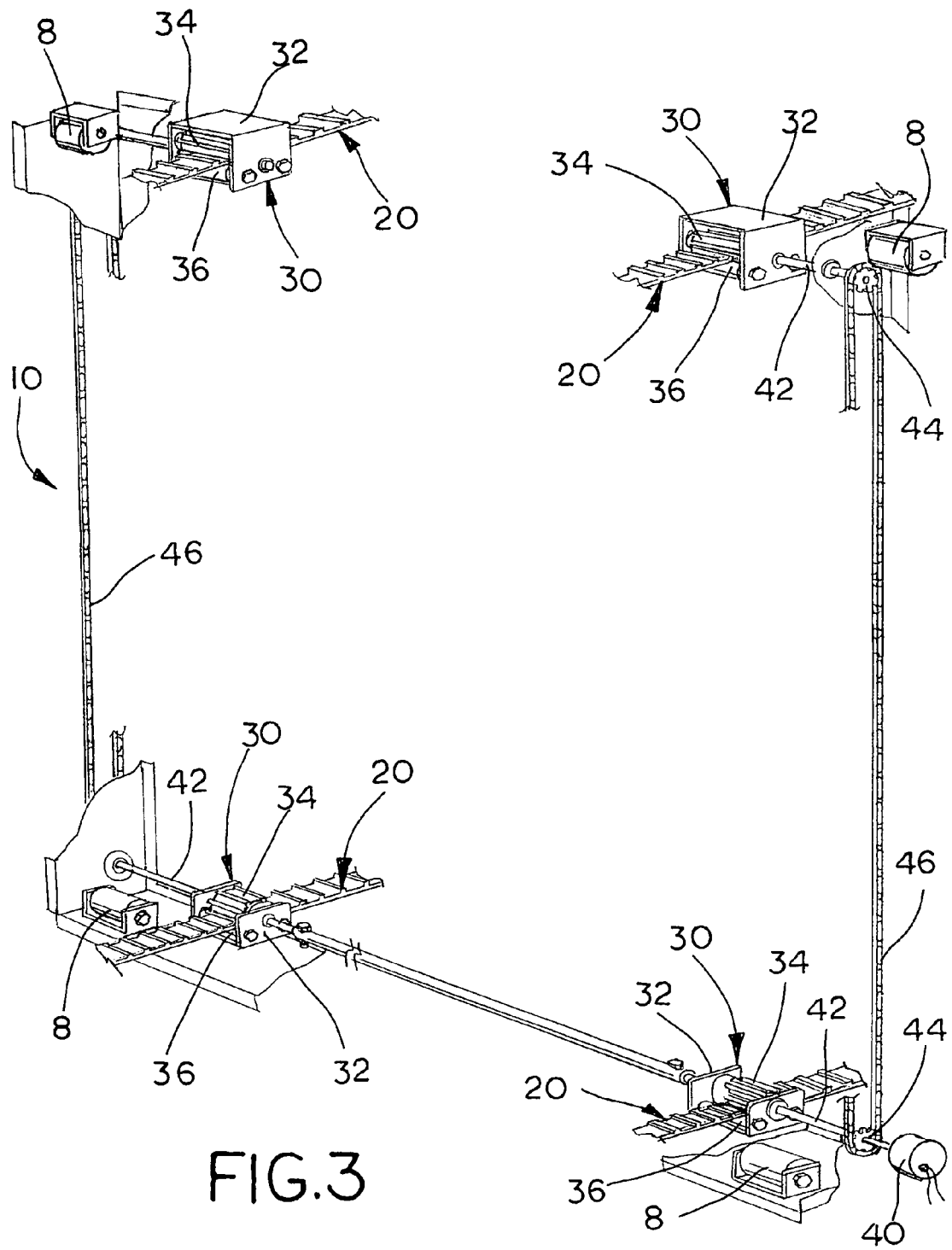
FIG. 3 is a partial perspective view of the actuation mechanism embodying the present invention.
Figure 4:
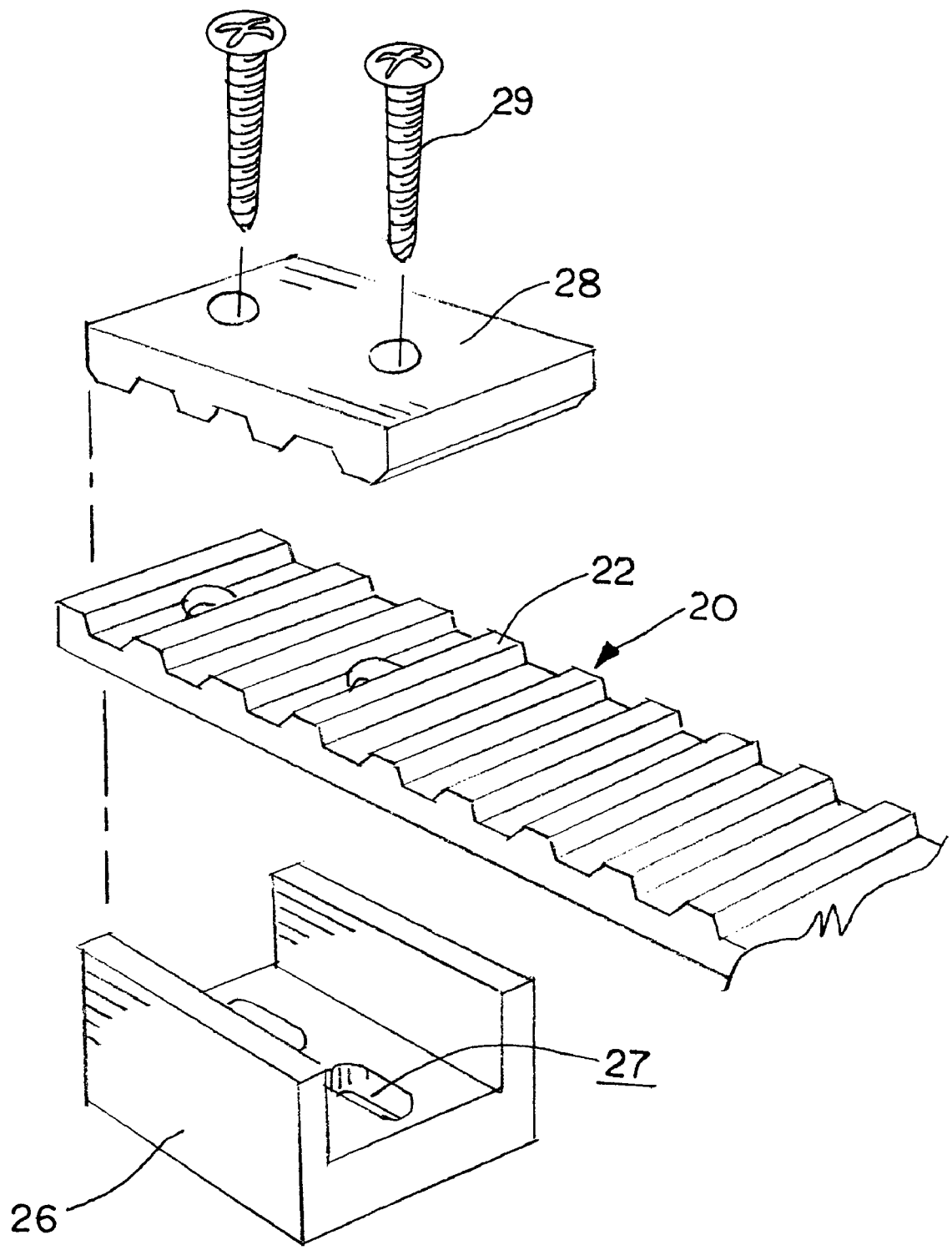
FIG. 4 is an exploded view of the adjustable attachment components for the timing belts used in the actuation mechanism of FIG. 3.

Actuator 10 uses reinforced polyurethane timing belts 20, such as the kind manufactured and distributed by Polytech Design, Inc. Of Clifton, N.J., as a flexible rack member in a rack and pinion type drive mechanism. Timing belts are used because they are designed to be strong, flexible and stretch resistant. Polyurethane timing belts are also light weight, durable and require little lubrication. Although, steel reinforced polyurethane timing belts are preferred, any other light weight, durable, stretch resistant timing belt may be employed within the teaching of this invention. As shown, timing belts 20 have a plurality of raised teeth 22, which extend lateral across one face of the belts. Generally, timing belts 20 have imbedded reinforcing fibers (not shown), which prevent longitudinal stretch of the belts. As best shown in FIG. 3, four timing belts 20 are mounted near the corners of slide-out room 2 with two timing belts 20 mounted to the outside of slide-out top 4 and two timing belts 20 mounted to the under side of slide-out floor 6. Timing belts 20 are mounted to slide-out room 2 longitudinally to the direction of the movement of slide-out room 2. Only the ends of each timing belt 20 are affixed to the slide-out room. The ends of each belt 20 are secured to slide-out top 4 and floor 6 and held in place by a U-shaped mounting channel 26 and a clamping plate 28. The ends of each timing belt 20 are seated within U-shaped mounting channel 26 and sandwiched by clamping plate 28 and affixed to slide-out top 4 and floor 6 by threaded fasteners 29 that extend through timing belt 20, mounting channel 26 and clamping plate 28. As shown, mounting channel 26 has longitudinal slots 27, which allow for linear adjustment of the position of timing belts 20 relative to its position on slide-out room 2. With the ends of timing belts 20 fixed to slide-out room 2, the middle length of timing belts 20 simply overlies or underlies slide-out top 4 or floor 6.

Figure 5:
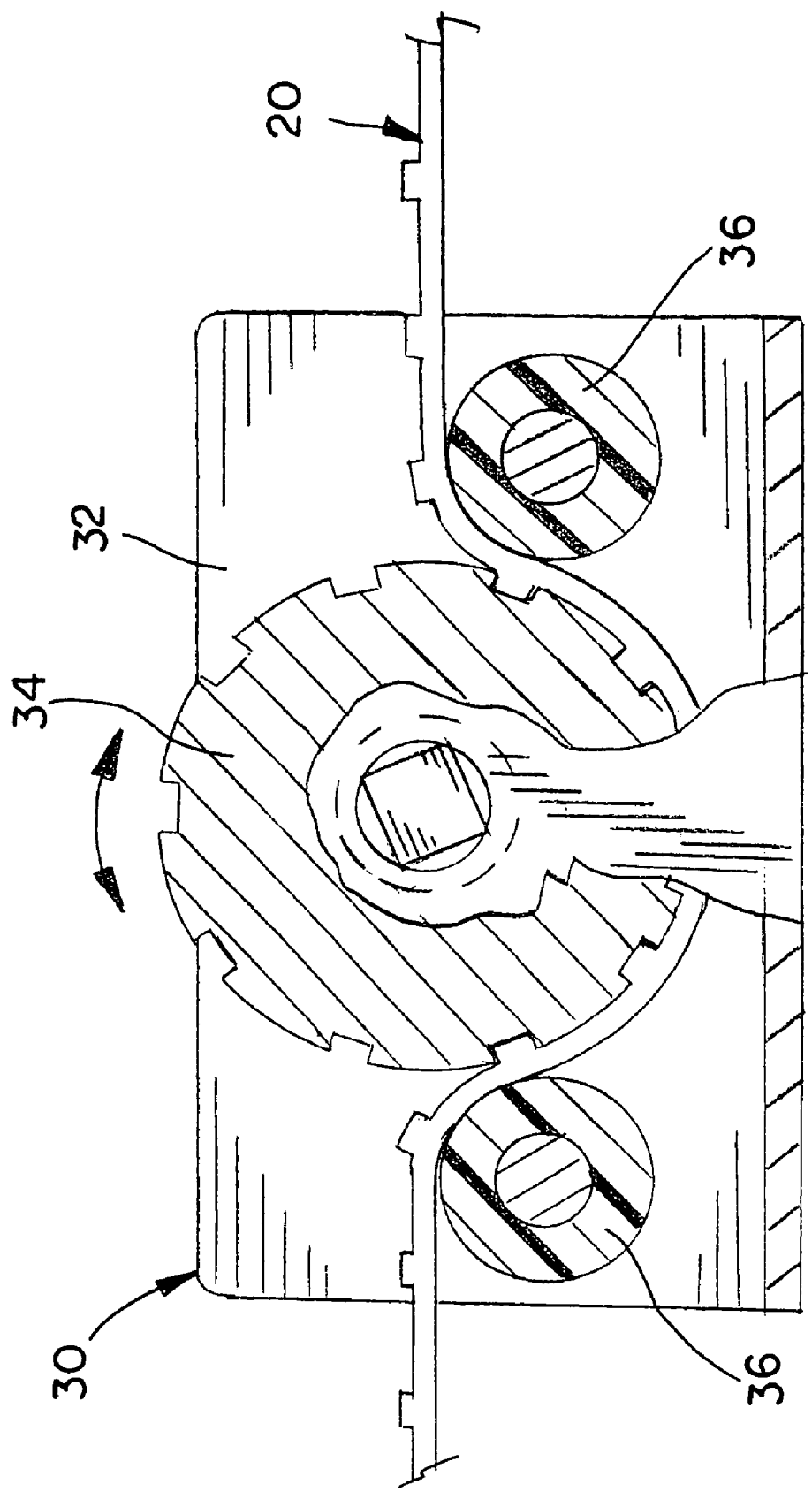
FIG. 5 is a side sectional view of the pinion block used in the actuation mechanism of FIG. 3.
Figure 6:
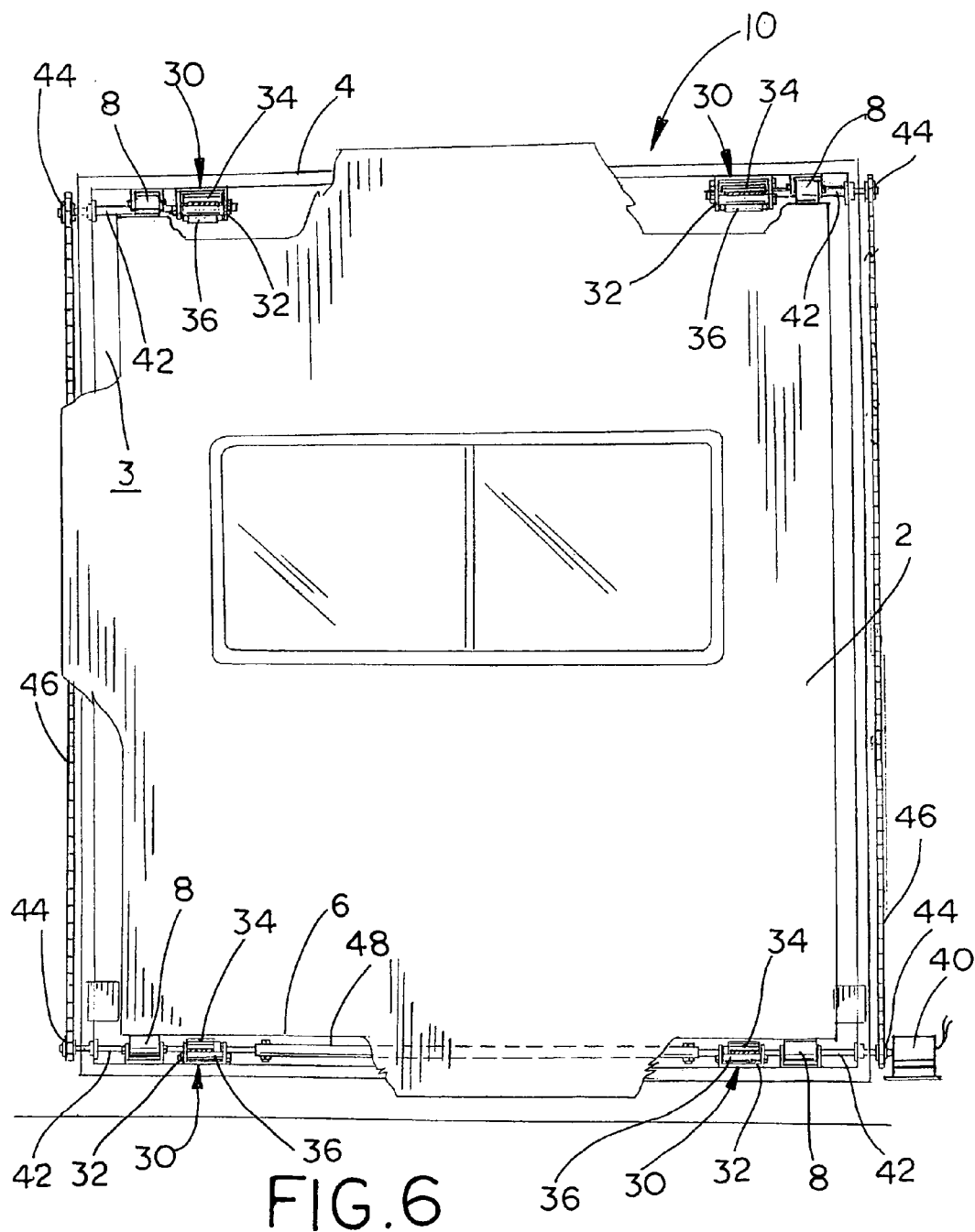
FIG. 6 is a partial front view of the slide-out room application of FIG. 1 with portions cutaway to show the actuation mechanism of FIG. 3.
Figure 8:
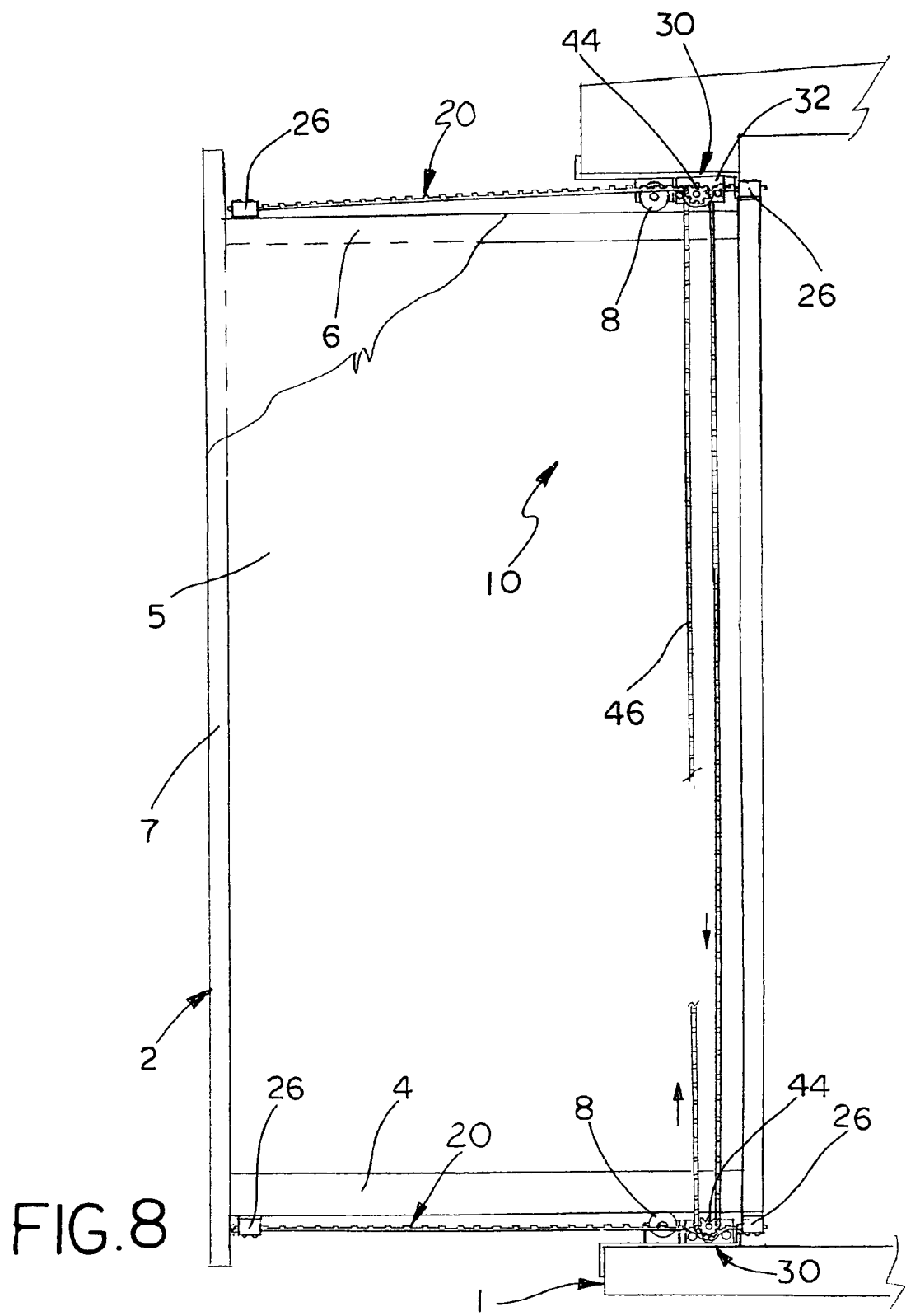
FIG. 8 is a partial side sectional view of the slide-out room application of FIG. 1 with the slide-out room in the extended position showing the actuation mechanism of FIG. 3.

Four drive blocks 30 are mounted along the bottom and top of the slide-out opening adjacent support rollers 8. As shown in FIG. 3, each drive block 30 includes a U-shaped bracket 32, which supports a pinion 34 and two idle rollers 36 on either side of the pinion. Each of timing belt 20 passes through drive block 30 being trained around pinion 34 between two idle rollers 36 in a serpentine fashion. As shown in FIG. 5, idle rollers 36 position timing belt 20 to wrap partially around pinion 34 to ensure a tight positive engagement between timing belt 20 and pinion 34. A reversible electric motor 40, which is operatively connected to all four drive blocks 30, simultaneously drives pinions 34 to propel timing belts 20 through drive blocks 30 thereby extending and retracting slide-out room 2 from the main compartment 1. Motor 40 is a conventional reversible AC or DC electric motor although any suitable drive motor may be used as desired. Motor 40 turns pinions 34 in one direction to extend slide-out room 2 and in the opposite direction to retract the slide-out room. Typically, motor 40 is disposed within the exterior side wall of the main compartment, which is accessible through an access panel (not shown) in the sidewall of the main compartment 1. As shown, the pinion 34 of each drive block 30 includes an elongated drive shaft 42 and a toothed drive sprocket 44. A drive chain 46 is trained around sprockets 44 of adjacent top and bottom drive blocks 30. The drive shafts of the bottom drive blocks 30 are connected by a cross shaft 48. Motor 40 is connected directly to drive shaft 42 of one pinion 34 (lower right). As shown in FIGS. 7 and 8, the rotation of pinion 34 propels timing belts 20 through drive block 30 to move slide-out room 2 between its extended and retracted position. Mounting channel 26 and clamping plate 28, which secure timing belts 20 to slide-out room 2 act as mechanical stops, which limit the travel of timing belts 20 through drive blocks 30.

While the present invention is illustrated and described where sprockets 44 and drive chains 46 operatively connect the pinions 34 to motor 40, any mechanism for simultaneously driving the four pinions may be employed within the teachings of this invention. As an example of such an alternative, but not intended to be exhaust of any such possible alternative, the sprockets and drive chains may be replaced with vertical drive shafts and gearboxes which are connected to pinion drive shafts 42. Other alternative distribution mechanisms may include the use of screw shafts, belt drives, and multiple motors each driving a different pinion or any other mechanical arrangement.

The present invention provides several significant benefits over conventional slide-out actuating mechanisms. Functionally, the use of flexible timing belts greatly reduces the height and profile of the actuation mechanism, thereby increasing the useful living space of the slide-out room, as well as reducing the weight of the actuation mechanism itself. Using four timing belts eliminates the need for additional support members, which helps maximize living space. The reduced weight of the timing belts over traditional rigid metal racks means smaller and less costly drive motors and components can be used. In addition, the flexibility of the timing belts and the serpentine engagement of the timing belt around the idle rollers and pinion ensures the smooth actuation of the slide-out room. Because the flexible timing belt wraps partly around the pinion, the weight of the slide-out room has less negative affects on the wear and operation of the actuator. Wrapping the timing belt partially around the pinion provides a tight positive engagement and eliminates the chance of slippage, which can cause misalignment of the slide-out during movement between its extended and retracted positions.

The use of timing belts in the actuator of this invention also provides manufacturing and maintenance advantages in slide-out room applications. Because timing belts are durable, resist stretch and require little lubrication, the actuator of this invention requires little care or maintenance once installed. In the rare case that adjustment or replacements are needed, the majority of the actuator's components are readily accessible. The timing belts are easily mounted to the slide-out floor and top, which means improved manufacturing ease. The mounting channels and clamping plates allow the slack timing belts to be quickly and readily tightened once operatively mated through the drive block. More importantly, the mounting channels and clamping plates allow for the adjustment of the timing belts relative to the slide-out room so that the slide-out room can be retracted and extended squarely from the main compartment. Because the ends of the timing belts can be selectively moved the timing belts can be adjusted to square the movement of the slide-out room, if the slide-out room, opening or main compartment is not perfectly square.

The embodiment of the present invention herein described and illustrated is not intended to be exhaustive or to limit the invention to the precise form disclosed. It is presented to explain the invention so that others skilled in the art might utilize its teachings. The embodiment of the present invention may be modified within the scope of the following claims.

I claim:

1. In a structure including a main compartment having an interior thereof and a side opening therein and an extensible slide-out room that moves through the side opening between a retracted position where the slide-out room is retracted into the compartment interior and an extended position where the slide-out room extends from the main compartment, an actuator for moving a slide-out room between a retracted position disposed within an opening within a main compartment and an extended position, the actuator comprising:

a flat flexible toothed belt mounted to the slide-out room longitudinally to the direction of the movement of the slide-out room, the belt having first and second ends, each of the first and second belt ends being spaced from the other and affixed to the slide-out room;

drive block mounted to within the side opening, the drive block includes a pinion and first and second idle rollers, the pinion being axially disposed between the first and second idle rollers, the belt being trained over the pinion between the first and second idle rollers in a serpentine fashion such that the belt partially wraps around the pinion in operative engagement therewith; and a motor operatively connected to the pinion for turning the pinion to reciprocally propel the belt between the first and second belt ends to move the slide-out room between the extended position and the retracted position.

2. The actuator of claim 1 and a mounting channel and a clamping plate for affixing each of the first and second belt ends to the slide-out room where the first and second ends are selectively positioned and affixed between the mounting channel and the clamping plate so as to allow for linear adjustment of the position of the belt relative to the slide-out room.

* * * * *